United States Patent [19]

Sasaki et al.

[11] Patent Number: 4,881,167
[45] Date of Patent: Nov. 14, 1989

[54] DATA MEMORY SYSTEM

[75] Inventors: Hisao Sasaki, Tachikawa; Matsuaki Terada, Machida; Susumu Matsui, Sagamihara; Kenji Kawakita, Yokohama; Jiro Kashio, Kawasaki; Shiro Baba, Tokorozawa, all of Japan; Yasushi Akao, Ithaca, N.Y.; Toshio Okochi, Ohme, Japan

[73] Assignee: Hitachi, Ltd., Tokyo, Japan

[21] Appl. No.: 318,439

[22] Filed: Mar. 2, 1989

Related U.S. Application Data

[63] Continuation of Ser. No. 63,081, Jun. 17, 1987, abandoned.

Foreign Application Priority Data

Jun. 18, 1986 [JP] Japan .................. 61-140062

[51] Int. Cl.$^4$ .............................................. G06F 12/00
[52] U.S. Cl. .................... 364/200; 364/239; 364/254.6
[58] Field of Search .............................. 364/200, 900

[56] References Cited

U.S. PATENT DOCUMENTS

| | | | |
|---|---|---|---|
| 3,559,187 | 1/1971 | Figueroa et al. | 364/200 |
| 3,878,513 | 4/1975 | Werner | 364/200 |
| 3,972,026 | 7/1976 | Waitman et al. | 364/900 |
| 4,131,940 | 12/1978 | Moyer | 364/200 |
| 4,366,536 | 12/1982 | Kohn | 364/200 |

Primary Examiner—Thomas M. Heckler
Attorney, Agent, or Firm—Antonelli, Terry & Wands

[57] ABSTRACT

A data memory system includes a plurality of buffer regions each having a constant size so that serial data may be stored by linking the buffer regions. A descripter provided to correspond to each of the buffer regions includes memory region addressing information indicating the head address of the corresponding buffer region, data delimiting information indicating whether or not the data to be stored is terminated in the corresponding buffer region, and chain information indicating the head address of a next subsequent descripter.

21 Claims, 3 Drawing Sheets

DATA MEMORY SYSTEM

This application is a continuation of application Ser. No. 07/063,081, filed June 17, 1987, now abandoned.

BACKGROUND OF THE INVENTION

The present invention relates to a data storage technique and, more specifically, to a technique which is effective if applied to a variable-length data memory system; for example, a technique which is effective when used with a storage system for storing the transmitted or received data of serial communications in a buffer memory by a DMA (i.e., Direct Memory Access) controller for block transfer control.

In serial communications between microcomputers, the transmission and reception of data is performed in a unit referred to as a "frame". Therefore, it is convenient to store the transmitted or received data with the individual frames being linked, even in the case where they are to be stored in the same buffer memory. However, it is frequently difficult to retain a series of available memory regions in the buffer memory to store a large amount of transmitted or received data or long-bit frames while also providing a high utilization efficiency of the memory space.

Therefore, a storage system will be examined in which a number of relatively small buffer regions are provided in a buffer memory and are sequentially linked for storage of data by use of descripters functioning as pointers, as shown in FIG. 2.

Specifically, two kinds of descripters referred to as "data descripters DTD" and "buffer descripters BFD" are linked to each other, and each buffer descripter BFD is associated with a buffer region BA having a constant size. Moreover, each of the aforementioned data descripters DTD and buffer descripters BFD is formed with two pointer portions, such that the head address BTA of the first buffer descripter BFD is introduced into the first pointer part of the data descripter DTD, whereas the head address DTA of the next data descripter DTD following the first-mentioned data descripter is introduced into the second pointer part. The head address BNA of the next buffer descripter BFD is introduced into the first pointer part of the aforementioned buffer descripter BFD, whereas the head address TA of a unit buffer region BA for storing the received data is introduced into the second pointer part. As a result, the received data of one frame is stored in an n-number (wherein n denotes an arbitrary integer) of buffer regions BA provided for the respective data descripters DTD. Incidentally, the aforementioned data descripters DTD and buffer descripters BFD are also stored in the buffer memory.

Some frames of the data to be transmitted or received in the aforementioned serial communications have a variable length, such as several bytes or several kilobytes. In the storage system shown in FIG. 2, however, the number of buffer regions BA to be linked under one data descripter DTD is fixed. Therefore, if the number of the buffer regions BA is fixed in conformity with the longest frame, an increased number of ineffective buffer regions (i.e., the portions other than those hatched in FIG. 2) are left unused in the case of short data having a frame of several bytes, so that the utilization efficiency of the memory is low. When the data consisting of serial frames is to be read out from buffer memory, on the other hand, the head address of the next data can not be determined unless both the data descripter and the buffer descripter are read. This raises the problem that it takes a long time to access the next data (or frame).

SUMMARY OF THE INVENTION

An object of the present invention is to provide a memory system which improves the utilization efficiency of a buffer memory for storing data having a variable-length frame and shortens the time required for obtaining desired data.

Representative features of the invention to be disclosed herein will be summarized in the following.

Specifically, data descripters and buffer descripters are integrated to provide a new type of descripter which is composed of: a first pointer part for receiving the head address of a first buffer region to receive the data of one frame; a second pointer part for receiving the head address of the next descripter; and an address column for receiving a data delimiting sign indicating the end of data, so that the received data may be sequentially linked while being delimited frame by frame by the new type descripter and stored in the buffer memories.

Since the number of buffer regions to be used for the respective frames changes with the length of the data of the variable-length frame, according to the above-specified means, the ineffective buffer regions left unused can be reduced to improve the utilization efficiency of the memory, and the head address of the data of the next frame can be obtained immediately when one descripter is extracted so that the above-specified object of shortening the time required for obtaining the data can be achieved.

The aforementioned and other objects and novel features of the present invention will become apparent from the description to be provided herein with reference to the accompanying drawings.

DESCRIPTION OF THE PREFERRED EMBODIMENTS

Figure 1:
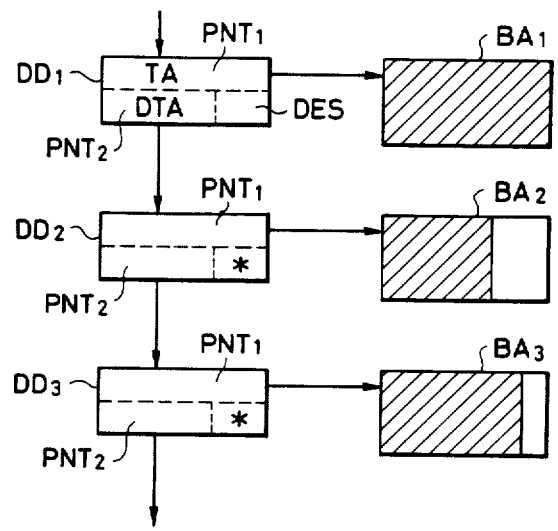
FIG. 1 is a diagram showing features of one embodiment of the variable-length memory system according to the present invention.

FIG. 1 shows one embodiment of the variable-length data memory system according to the present invention. In this embodiment, buffer regions $BA_1$, $BA_2$, $BA_3$ and so on, of a constant size and provided in a buffer memory, can be linked by a descripter DD which is composed of a first pointer $PNT_1$ and a second pointer $PNT_2$. Specifically, the first pointer $PNT_1$ of the descripter DD of this embodiment designates the head address TA of the buffer region having the received data of one frame, whereas the second pointer $PNT_2$ designates the head address DTA of a memory region having the next descripter (DDi+1) following the descripter (DDi). Moreover, each descripter DD is formed with an address column DES for providing a data delimiting sign indicating whether or not the received data ends in the buffer region designated by that descripter DD.

Next, how to store the received data using the aforementioned descripter DD will be described in the following. In case data of a frame shorter than the storable data length comes into the individual buffer regions BA provided in the buffer memory, as in the descripter $DD_3$ shown in FIG. 1, the head address of one of the empty buffer regions of the memory, e.g. $BA_3$, is designated in the first pointer $PNT_1$ of the descripter $DD_3$ so that the data of one frame is introduced into the buffer of the head address instructed by that pointer $PNT_1$. In the address column DES of that descripter $DD_3$, moreover, there is provided a data delimiting sign * indicating presence of the end of the data in the buffer region $BA_3$. In view of this sign, it can be instantly determined that the data ends in the buffer region instructed by the pointer $PNT_1$.

In case of receipt of data of plural frames, on the other hand, there is designated in the second pointer $PNT_2$ of the descripter DD the head address of the descripter to be used for the next frame. This indicates the linkage of the data of the plural frames. For the descripter for addressing the buffer region for receiving the data of a final frame, it is unnecessary to designate anything in the DTA portion of the second pointer.

In case data of a frame longer than the storable data length is received in the individual buffer regions BA, on the other hand, as in the descripter $DD_1$ shown in FIG. 1, the head address of the buffer region $BA_1$ to receive that data is designated in the first pointer $PNT_1$. In the second pointer $PNT_2$ of the descripter $DD_1$, moreover, there is designated the head address of the descripter $DD_2$ addressing the buffer region to receive the succeeding data, while the address column DES of the descripter $DD_1$ is left vacant. Thus, the plural buffer regions BA are sequentially linked by the descripters DD to sequentially store the data of one frame. When the buffer region for receiving the final part of the data of one frame is reached, moreover, the data delimiting sign * is designated in the address column DES in the descripter corresponding to that end buffer region, such as the descripter $DD_2$ shown in FIG. 1.

Figure 2:
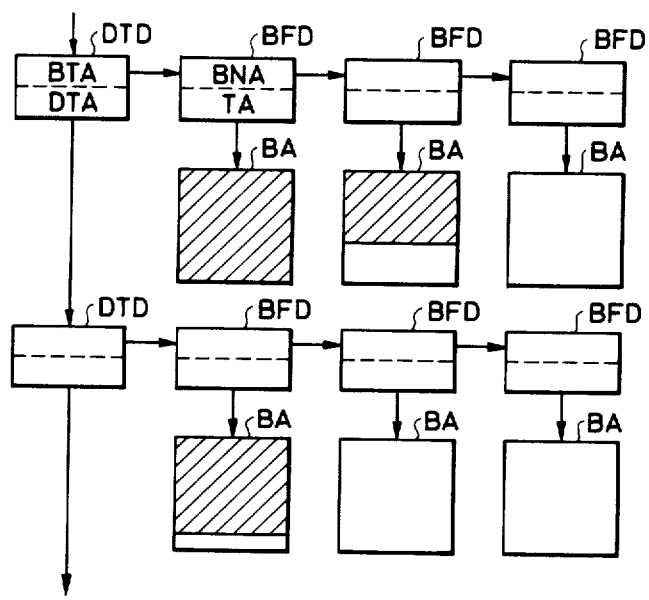
FIG. 2 is a diagram showing one embodiment of a data memory system which has been considered prior to the present invention.

In the embodiment described above, in case the lengths of the data (or frames) to be stored in the memory are different, the number of the buffer regions to be used is changed in accordance with the length of that data. This eliminates any ineffective buffer region left unused, as in the system shown in FIG. 2, so that the utilization efficiency of the memory is accordingly improved. In case data of a certain frame of the data stored in the memory is to be read out, moreover, the descripter for addressing the buffer region having the data of a desired frame may be sought on the basis of the data delimiting sign in the address column DES of the descripter DD to obtain the head address from its inside first pointer $PNT_1$ thereby to read out the data in the buffer region. As a result, according to the system of the present embodiment, the head address of the buffer region having the desired data can be obtained merely by extracting one descripter. This shortens the time period for acquiring the head address of the next buffer, as compared with the system of FIG. 2, in which the head address cannot be obtained unless two descripters (i.e., the data descripter and the buffer descripter) are extracted in an orderly manner.

Incidentally, in the embodiment described above, the descripter DD is composed of the first pointer $PNT_1$ acting as the memory region addressing information description part for addressing the head address of the buffer region to be used, the second pointer $PNT_2$ acting as the chain information description part for addressing the head address of the next descripter, and the address column DES acting as the data delimiting information description part. If, however, continuous address regions for storing the aforementioned descripters are provided in the memory, for example, the address of the next descripter can be obtained merely by incrementing the address so that the second pointer acting as the chain information description part can be omitted.

In the aforementioned embodiment, moreover, the size of the buffer regions can be determined at will. In this case, the size of the ineffective regions can be reduced for the smaller buffer regions. If, however, the buffer regions are made excessively small, the number of descripters to be used for one frame is increased, especially when there are several long frames, so that the memory regions required for storing the descripters become large. Balancing these two considerations, therefore, the size of a unit buffer region may be determined in accordance with the average frame length.

Figure 3:
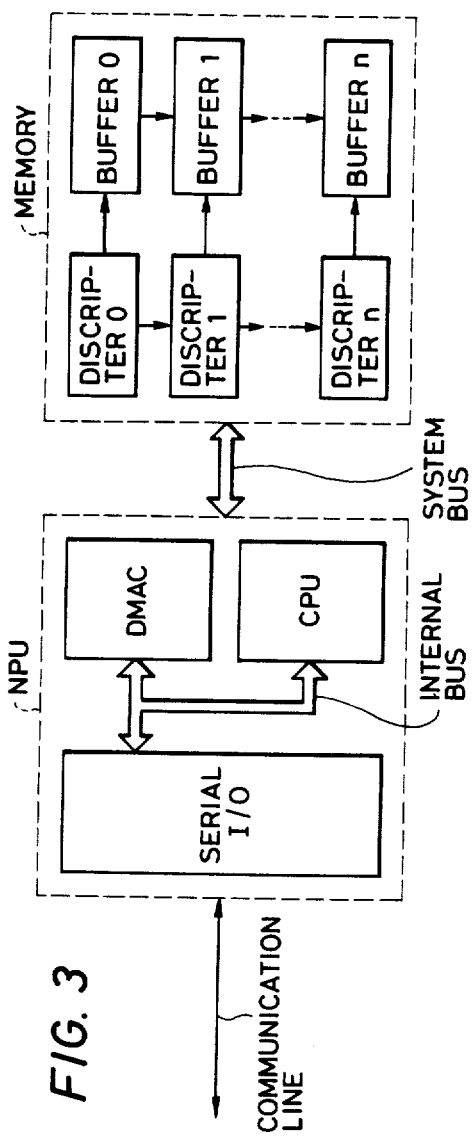
FIG. 3 is a block diagram showing one embodiment of a system to which the present invention is applied.

FIG. 3 is a block diagram showing a MEMORY for storing data in accordance with the data memory system of the present invention, and a communication controlling processor NPU (i.e., Network Processing Unit) for writing data in or reading data out of that MEMORY. The processor NPU contains a SERIAL I/0 having functions to convert serial data to parallel data and vice versa, a CPU having control and arithmetic functions, and a DMAC (i.e., Direct Memory Access Controller) having a function to transfer data directly and not through the register of the CPU.

The NPU is constructed on one semiconductor substrate. The SERIAL I/0, the CPU and DMAC are interconnected through an INTERNAL BUS. The serial data is converted, when received through a COMMUNICATION LINE, into a parallel data by the SERIAL I/0. Moreover, whether or not an error is present in the received data is checked, and the kind of the error, if any, is determined. The results are stored in a status register (not shown) of the SERIAL I/0.

Figure 4:
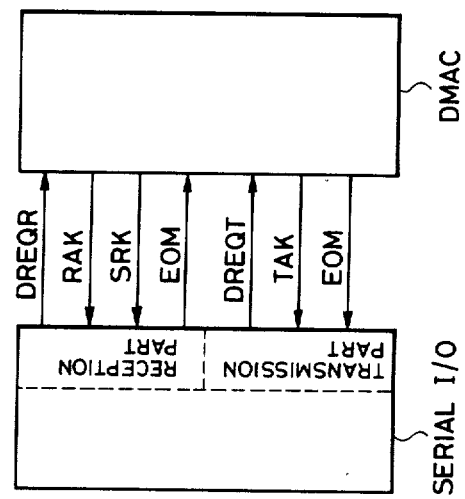
FIG. 4 is a block diagram showing the relation between the DMAC and the serial I/0 shown in FIG. 3.

FIG. 4 shows signal lines between the SERIAL I/0 and the DMAC. Specifically, the signal lines between the reception part of the SERIAL I/0 and the DMAC are for transmitting a DMAC reception request signal DREQR, a received data acknowledge signal RAK, a status acknowledge SRK and an end-of-message signal EOM. If the received data is stored in the SERIAL I/0, a transfer request is made when the aforementioned signal DREQR is transmitted from the SERIAL, I/0 to the DMAC. Next, a timing, at which the received data is to be sent out to the INTERNAL BUS, is transmitted when the signal RAK is transmitted from the DMAC to the SERIAL I/0. When the signal SRK is transmitted from the DMAC to the SERIAL I/0, moreover, the timing, at which the content of the aforementioned status register is to be sent out to the INTERNAL BUS, is transmitted. The signal EOM is used to inform the DMAC of the end of the frame of the data to be transferred to the DMAC. As a result, the DMAC can delimit the received data for each frame and properly administer it.

Between the transmission part of the SERIAL I/0 and the DMAC, there are interposed signals lines for transmitting the DMAC send request signal DREQT, the send data acknowledge signal TAK and the end-of-message signal EOM. A transfer request for the read data from the MEMORY is made by transmitting the aforementioned signal DREQT from the SERIAL I/0 to the DMAC. Next, the timing, at which the SERIAL I/0 is to receive the data from the INTERNAL BUS, is transmitted by transmitting signal TAK from the DMAC to the SERIAL I/0. By transmitting the signal EOM from the DMAC to the SERIAL I/0, moreover, it is indicated to the SERIAL I/0 that the data transferred by the DMAC is the end of the frame.

The NPU is connected through the SYSTEM BUS with the external MEMORY. This MEMORY does not have a specified construction and type, but may be constructed of a one-chip semiconductor memory or a plural-chip semiconductor memory. In this MEMORY, there are disposed a plurality of storage regions BUFFER 0 to BUFFER n to store the received data, and a plurality of descripters DESCRIPTER 0 to DESCRIPTER n to store information concerning the individual buffers.

Figure 5:
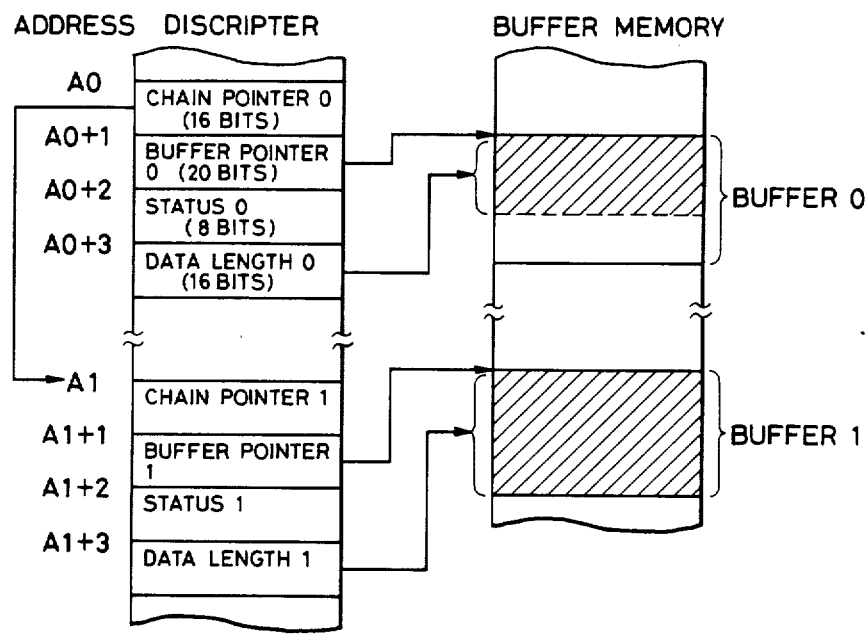
FIG. 5 is a diagram showing the relation between the information stored in each descripter and the buffer memory corresponding to the descripter.

FIG. 5 shows the relation between the information stored in each descripter and the buffer memory corresponding to each descripter. In this embodiment, each descripter is composed of four regions, which have serial numbers as their head addresses. For example, the DESCRIPTER 0 is composed of a CHAIN POINTER 0 having a head address A0, a BUFFER POINTER having a head address A0+1, a STATUS 0 having a head address A0+2, and a DATA LENGTH 0 having a head address A0+3. Thus, the addresses for addressing the individual regions are associated with one another. If the address of one region of the descripter is known, the address of another region can be easily determined. For example, the DMAC is not required to read out any information from the MEMORY to know the address of other regions of a descripter if the address of one region is known. The aforementioned head address A0 becomes the head address of that DESCRIPTER 0. Other descripters DESCRIPTER 1 to DESCRIPTER n are also constructed like the aforementioned DESCRIPTER 0.

The aforementioned CHAIN POINTER 0 is composed of 16 bits, for example, and designates the head address A1 of the next descripter DESCRIPTER 1. The aforementioned BUFFER POINTER 0 is composed of 20 bits, for example, to designate the head address of the buffer BUFFER 0 belonging to the DESCRIPTER 0. The STATUS 0 is composed of 8 bits, for example, to indicate information concerning the data stored in the BUFFER 0. The content of the STATUS 0 is written by the DMAC at the time of data reception, and the CPU provides information for initialization thereof at the time of data transmission. The written information is the content of the status register in the SERIAL I/0, such as information concerning whether or not the end of the frame is present in the BUFFER 0 under consideration. The DATA LENGTH 0 indicates the number of bytes of data in BUFFER 0. The content of the DATA LENGTH 0 is written by the DMAC at the time of data reception, and the initialization thereof is conducted by the CPU at the time of data transmission. The DMAC writes the number of bytes of the data, which are written in the buffer, after the received data has been written in that buffer.

Figure 6:
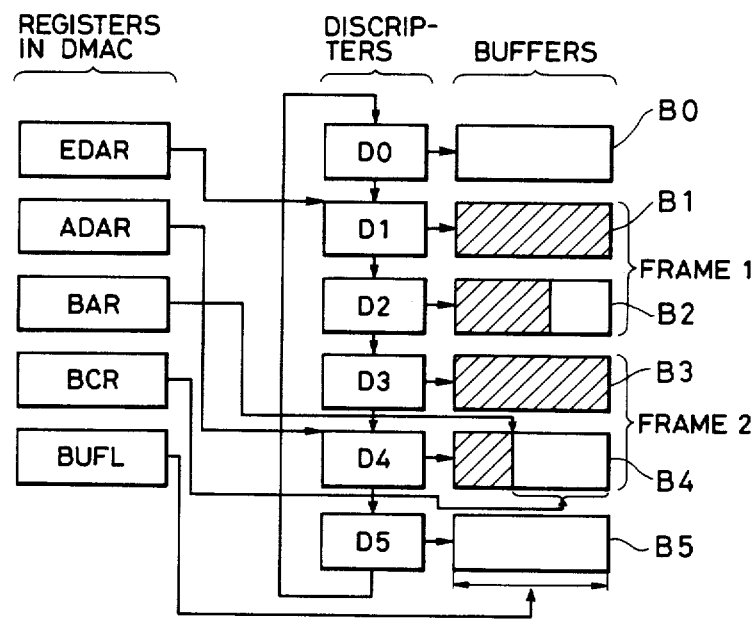
FIG. 6 is a diagram showing a group of registers disposed in the DMAC shown in FIG. 3 and their roles.

FIG. 6 shows the group of registers disposed in the DMAC and their roles. On the other hand, Table 1 enumerates the actions of the aforementioned individual registers in the reception mode. In FIG. 6, the hatched portions in the buffers show the states of the buffers in connection with the data which has already been written. A register EDAR designates the head address of the descripter D1 subsequent to the descripter D0 indicating the final one of the writable buffers, such as a buffer B4. A register ADAR designates the head address of the descripter D4 indicating the buffer B4 in the writing operation. A register BUFL designates the buffer number (or byte number). A register BCR designates the byte number of the remaining buffer region other than the writing buffer B4. A register BAR designates the address of the data being accessed in the writing buffer B4.

Table 2 enumerates the actions of the aforementioned individual registers in the transmission mode. The data is written in the reception mode of Table 1, whereas the data is read out in the transmission mode of Table 2.

TABLE 1

| | Actions of DMAC Built-in Registers in Reception Mode | | | | |
|---|---|---|---|---|---|
| Names of Registers | EDAR (ERROR DISCRIPTER ADDRESS REGISTER) | ADAR (ACCESS DISCRIPTER ADDRESS REGISTER) | BUFL (BUFFER LENGTH) | BCR (BYTE COUNT REGISTER) | BAR (BUFFER ADDRESS REGISTER |
| Number of Bits | 16 | 16 | 16 | 16 | 20 |
| Roles of Registers | The head address of a discripter subsequent to the discripter indicating the final one of the writable buffers is designated | The head address of the discripter indicating the writing buffer is designated. | The buffer length (or byte number) is designated. | The byte number of the remaining buffer region of the writing buffer is counted. | The address of the data on the buffer being accessed is designated. |
| Functions of DMAC | Operations of DMAC to Be Started by the Register under Consideration: | — | At the start of the receiving operation, the writing operation is started from the head of the buffer belonging to the discripter indicated by this register. | — | If the value of this register takes 0, the DMAC ends the writing operation of the buffer of the register. | If a write request is made, the data are written in the address designated by this register. |
| | | The transfer is ended if an instruction of the writing operation in the buffer is given in the state where the contents of the EDRAR and ADAR are coincident. | | | | |
| | | When the writing | | | An increment is | An increment is |

TABLE 1-continued

Actions of DMAC Built-in Registers in Reception Mode

| Names of Registers | EDAR (ERROR DIS-CRIPTER ADDRESS REGISTER) | ADAR (ACCESS DIS-CRIPTER ADDRESS REGISTER) | BUFL (BUFFER LENGTH) | BCR (BYTE COUNT REGISTER) | BAR (BUFFER ADDRESS REGISTER) |
|---|---|---|---|---|---|
| Renewal of Register under Consideration: | — | operation in the buffer being accessed is ended, the head address of the next discripter is written. | — | made each time one byte is written. When the buffer is changed, the value of the BUFL is written. | made each time one byte is written. When the buffer changed, the head address of the next buffer is written. |
| Renewal of Register under Consideration by CPU | At the start of the writing operation, the head address of the discripter indicating the buffer preceding the buffer to have its writing operation started is written. | At the start of the writing opertion, the head address of the discripter indicating the buffer to have its writing operation started is written. | Initialization | — | — |

TABLE 2

Actions of DMAC Built-in Registers in Transmission Mode

| | Name of Registers | EDAR (ERROR DIS-CRIPTER ADDRESS REGISTER) | ADAR (ACCESS DIS-CRIPTER ADDRESS REGISTER) | BUFL (BUFFER LENGTH) | BCR (BYTE COUNT REGISTER) | BAR (BUFFER ADDRESS REGISTER) |
|---|---|---|---|---|---|---|
| | Number of Bits | 16 | 16 | 16 | 16 | 20 |
| | Roles of Registers | The head address of a discripter indicating a buffer subsequent to the last one of the buffers to have its reading operation conducted is designated. | The head address of the discripter indicating the reading buffer is designated. | The buffer length (or byte number) is designated. | The byte number of the remaining data in the reading buffer is counted. | The address of the data on the buffer being accessed is designated. |
| Functions of DMAC | Operations of DMAC to Be Started by the Register under Consideration: | — | At the start of the transmitting operation, the reading operation is started from the head of the buffer belonging to the discripter indicated by this register. | | If the value of this register takes 0, the DMAC ends the reading operation of the buffer of the register. | If a read request is made, the data are read out from the address designated this register. |
| | | The transfer is ended if an instruction of the reading operation is given in the state where the contents of the EDRAR and ADAR | | | — | |
| | Renewal of Register under Consideration: | — | When the reading operation in the buffor being accessed is ended, the head address of the next discripter is written. | — | A decrement is made each time one byte is written. When the buffer is changed, the byte length recorded in the discripter is written. | An increment is made each time one byte is read. When the buffer is changed, the head address of the next buffer is written. |
| | Renewal of Register under Consideration by CPU | The head address of the discripter indicating the buffer subsequent to the last buffer having the data to be transmitted is written. | At the start of the transmission, the head address of the discripter indicating the buffer to have its transmission started is written. | Upon the data setting, the buffer length is written. | — | — |

As has been described hereinbefore, the memory region is formed with a plurality of buffer regions of a constant size, and these buffer regions are linked to store serial data by using the descripter which has the memory region addressing information descriptive part for receiving the head address of one of the aforementioned buffer regions and the data delimiting information descriptive part for instructing whether or not the data to be stored ends in the corresponding buffer region. As a result, thanks to the action of changing the number of the buffer regions to be used for the individual frames in accordance with the length of the data of a variable-length frame, the ineffective buffer regions left unused are reduced with the result that the memory utilization efficiency is improved.

There is provided a new type of descripter which is composed of a first pointer part for receiving the head address of a first buffer region to receive the data of one frame, a second pointer part for receiving the head address of a next descripter, and an address column for receiving a data delimiting sign indicating the end of data, so that the received data may be sequentially linked while being delimited frame by frame by the new type descripter and stored in the buffer memories. As a result, there is obtained another effect that the time period required for reading out the data of the next frame is shortened.

More specifically, when the reading operation of the end data of a certain frame is completed, the descripter corresponding to the buffer region (e.g., the BUFFER 0 of FIG. 5) which contains that end data is first accessed. At this time, the head address (A0) of that descripter is accessed, and the chain pointer (CHAIN POINTER 0) is read out so that the head address (A1) of the next descripter can be obtained. Next, the address (A1+1) separated by a constant value from that head address (A1) is accessed. As a result, the buffer pointer (BUFFER POINTER 1) is read out so that the head address of the data of the next frame is obtained. As a result, according to the present invention, the number of access times of the descripter from the end of reading out the data of a certain frame to the start of reading out the data of a next frame is reduced to only two. This also applies to the data writing operation. Generally speaking, the data reading or writing speed is seriously influenced by the aforementioned access times of the descripter. In the system shown in FIG. 2, the descripter has to be accessed three times from the end of reading out of the data of a certain frame to the start of reading out of the data of the next frame. As a result, according to the present invention, the reading or writing operation can be speeded up in the case in which a plurality of frames are continuously read or written.

Although our invention has been specifically described hereinbefore in connection with preferred embodiments thereof, it should not be limited to the embodiments, but can naturally be modified in various ways within the scope thereof.

In the description thus far provided, our invention has been described in a case where the received data in the serial communications or the application field providing the background thereof is to be stored in a buffer memory. However, the present invention should not be limited thereto, but can be utilized generally in case variable-length data is to be stored in memory.

The effects to be obtained by the features of the invention disclosed herein will be briefly described in the following. Specifically, it is possible to improve the utilization efficiency of the buffer memory for storing data of a variable-length frame and to shorten the time period required for reading out the desired data.

What is claimed is:

1. A data memory system comprising:
a plurality of buffer regions, each buffer region having a respectively predetermined memory capacity for storing data;
a like plurality of descripter regions, each descripter region corresponding with a respective one of said plurality of buffer regions, each descripter region including a first portion for containing buffer region addressing information, designating the address of the corresponding one of said plurality of buffer regions, and a second portion for containing chain information, designating the address of another descripter region to be linked to said each descripter region so that said each descripter region is capable of being linked to another descripter region, allowing data stored in said buffer regions to be linked on the basis of the chain information in said descripter regions.

2. A data memory system according to claim 1, wherein each descripter region further includes a third portion adapted for containing data delimiting information indicating that the corresponding buffer region contains data including an end of data frame indication.

3. A data memory system according to claim 2, wherein each first portion contains buffer region addressing information designating the head address of said corresponding one of said plurality of buffer regions, and wherein each second portion contains chain information identifying the head address of said another descripter region.

4. A memory system comprising:
a memory including a plurality of addressable buffer regions, each buffer region having a respectively predetermined memory capacity for storing data, and a like plurality of descripter regions, each descripter region corresponding with a respective one of said plurality of buffer regions; and
memory access means for executing data writing and data reading operations with said memory;
each of said descripter regions including a first portion for containing buffer region addressing information, designating the address of the corresponding one of said plurality of buffer regions, and a second portion for containing chain information, designating the address of another descripter region to be linked to said each descripter region so that said each descripter region is capable of being linked to another descripter region, allowing data stored in said buffer regions to be linked on the basis of the chain information in said descripter regions.

5. A memory system according to claim 4, wherein said memory access means includes a direct memory access controller.

6. A memory system according to claim 5, wherein said direct memory access controller includes means for storing the address of the descripter region corresponding with the buffer region with which data is to be written or read.

7. A memory system according to claim 6, wherein said direct access memory controller further includes means for transmitting and receiving the data to be stored in said each buffer region in serial communication of data frames.

8. A memory system according to claim 4, wherein each descripter region further includes a third portion adapted for containing data delimiting information indicating that the corresponding buffer region contains data including an end of data frame indication, indicating that there are no subsequent linked buffer regions containing linked data.

9. A memory system comprising:
memory means including a first memory region for storing at least part of a data communication, a second memory region for storing at least part of a data communication, a third memory region for storing first descripter information relating to said first memory region, and a fourth memory region for storing second descripter information relating to said second memory region, said first descripter information including first address information for designating the address of said first memory region, second address information for designating the address of said fourth memory region, and data delimiting information indicating whether said first memory region contains the end of the data communication stored therein, and said second descripter information including third address information for designating the address of said second memory region; and memory access means for interrogating said third memory region, obtaining the first address information, accessing said first memory region to access the data communication stored therein, obtaining the second address information, interrogating said fourth memory region, obtaining the third address information, and accessing said second memory region to access the data communication stored therein.

10. A memory system according to claim 9, wherein said first descripter information further includes first data length information indicating the length of the data stored in said first memory region, and said second descripter information further includes second data length information indicating the length of the data stored in said second memory region.

11. A memory system according to claim 10, wherein said first data length is different from said second data length.

12. A memory system according to claim 9, wherein said first address information includes the head address of said first memory region, said second address information includes the head address of said fourth memory region, and said third address information includes the head address of said second memory region.

13. A memory system according to claim 9, wherein said first memory region has a capacity substantially the same as the capacity of said second memory region.

14. A memory system according to claim 9, wherein each of said first memory region and said second memory region is adapted to transmit and receive data in serial communication of data frames for storage therein.

15. A microprocessor system comprising:

memory means including a first memory region for storing at least part of a data communication, a second memory region for storing at least part of a data communication, a third memory region for storing first descripter information relating to said first memory region, and a fourth memory region for storing second descripter information relating to said second memory region, said first descripter information including first address information for designating the address of said first memory region, second address information for designating the address of said fourth memory region, and data delimiting information indicating whether said first memory region contains the end of the data communication stored therein, and said second descripter information including third address information for designating the address of said second memory region;

memory access means for interrogating said third memory region, obtaining the first address information, accessing said first memory region to access the data communication stored therein, obtaining the second address information, interrogating said fourth memory region, obtaining the third address information, and accessing said second memory region to access the data communication stored therein; and a CPU for controlling said memory access means.

16. A microprocessor system according to claim 15, wherein said first descripter information further includes first data length information indicating the length of the data stored in said first memory region, and said second descripter information further includes second data length information indicating the length of the data stored in said second memory region.

17. A microprocessor system according to claim 16, wherein said first data length is different from said second data length.

18. A microprocessor system according to claim 15, wherein said first address information includes the head address of said first memory region, said second address information includes the head address of said fourth memory region, and said third address information includes the head address of said second memory region.

19. A microprocessor system according to claim 15, wherein said first memory region has a capacity substantially the same as the capacity of said second memory region.

20. A microprocessor system according to claim 15, wherein each of said first memory region and said second memory region is adapted to transmit and receive data in serial communication of data frames for storage therein.

21. A method of operating a memory system including a first memory region storing at least part of a first data communicating having a first data length, a second memory region storing at least part of a second data communication having a second data length, a third memory region storing first descripter information relating to the first memory region, and a fourth memory region storing second descripter information relating to the second memory region, the first descripter information including first address information designating the address of the first memory region and second address information designating the address of the fourth memory region and the second descripter information including third address information designating the address of the second memory region, said method comprising the steps of:

interrogating the third memory region;
obtaining the first address information;
accessing the first memory region;
obtaining the second address information;
interrogating the fourth memory region;
obtaining the third address information; and
accessing the second memory region to read data therefrom or write data thereinto.

* * * * *